(12) United States Patent
Teulet

(10) Patent No.: US 10,144,177 B2
(45) Date of Patent: Dec. 4, 2018

(54) METHOD AND APPARATUS FOR CONTROLLING A LASER BEAM FOR MANUFACTURING THREE-DIMENSIONAL OBJECTS BY MEANS OF STACKED LAYERS

(71) Applicant: PHENIX SYSTEMS, Riom (FR)

(72) Inventor: Patrick Teulet, Riom (FR)

(73) Assignee: PHENIX SYSTEMS, Riom (FR)

(*) Notice: Subject to any disclaimer, the term of this patent is extended or adjusted under 35 U.S.C. 154(b) by 709 days.

(21) Appl. No.: 14/412,800

(22) PCT Filed: Jul. 3, 2013

(86) PCT No.: PCT/EP2013/064037
§ 371 (c)(1),
(2) Date: Jan. 5, 2015

(87) PCT Pub. No.: WO2014/006094
PCT Pub. Date: Jan. 9, 2014

(65) Prior Publication Data
US 2015/0151491 A1    Jun. 4, 2015

(30) Foreign Application Priority Data
Jul. 6, 2012 (FR) ..................... 12 56511

(51) Int. Cl.
*B29C 64/135* (2017.01)
*B29C 64/386* (2017.01)
(Continued)

(52) U.S. Cl.
CPC .......... *B29C 64/386* (2017.08); *B22F 3/1055* (2013.01); *B29C 64/135* (2017.08);
(Continued)

(58) Field of Classification Search
CPC ... G01B 11/2513; G01B 11/24; B22F 3/1055; B22F 2998/00; B22F 2999/00;
(Continued)

(56) References Cited

U.S. PATENT DOCUMENTS 5,562,929 A * 10/1996 Asano ................... B29C 64/135
264/401
6,311,098 B1 * 10/2001 Higasayama ...... G05B 19/4099
700/159

(Continued)

FOREIGN PATENT DOCUMENTS

DE         10112591  A1    10/2011
DE     102011105045  B3     6/2012
(Continued)

OTHER PUBLICATIONS

International Search Report, dated Sep. 12, 2013, from corresponding PCT application.

(Continued)

*Primary Examiner* — Robert E Fennema
*Assistant Examiner* — Marzia T Monty
(74) *Attorney, Agent, or Firm* — Young & Thompson

(57) ABSTRACT

Disclosed is a method for controlling a laser beam for manufacturing three-dimensional objects by stacked layers, including, for each layer, a step for using a laser beam to solidify a zone corresponding to a two-dimensional object to be manufactured, such a two-dimensional section having a geometric contour. The method includes, for at least one the two-dimensional section, a step of acquiring (50) the geometric contour of the two-dimensional section, a step of determining (52) a reference path from the geometric contour of the section, the reference path having a shape correlated to the shape of the geometric contour, a step of determining (54) a set of paths based on the reference path, (Continued)

and a step of controlling (58) the laser beam to travel all of the determined paths using a travel strategy defining a travel order of the paths and a starting point for each path.

11 Claims, 4 Drawing Sheets

(51) Int. Cl.
  *B33Y 30/00* (2015.01)
  *B22F 3/105* (2006.01)
  *B33Y 50/02* (2015.01)
  *G05B 15/02* (2006.01)
  *B29C 64/153* (2017.01)

(52) U.S. Cl.
  CPC ............ *B29C 64/153* (2017.08); *B33Y 30/00* (2014.12); *B33Y 50/02* (2014.12); *G05B 15/02* (2013.01); *Y02P 10/295* (2015.11)

(58) Field of Classification Search
  CPC .... B22F 1/0003; B22F 1/0007; B22F 1/0048; B22F 2003/1057; B22F 2203/01; G05B 19/41; G05B 19/4099; G05B 19/4097; G05B 19/4103; G05B 15/02; G01J 3/46; G01N 21/47; H04N 13/0221; H04N 2213/001; B29C 67/0088; B29C 64/386; B29C 64/153; B29C 64/135; B33Y 30/00; B33Y 50/02; Y02P 10/295
  See application file for complete search history.

(56) References Cited

U.S. PATENT DOCUMENTS

| | | | |
|---|---|---|---|
| 6,677,554 B2 | 1/2004 | Darrah et al. | |
| 2003/0127436 A1* | 7/2003 | Darrah | B29C 67/0077 219/121.66 |
| 2010/0074403 A1* | 3/2010 | Inglese | A61B 6/14 378/39 |
| 2011/0190922 A1* | 8/2011 | Walker | B24B 13/06 700/118 |
| 2013/0178839 A1* | 7/2013 | Bischoff | A61F 9/00829 606/5 |
| 2014/0052288 A1* | 2/2014 | El-Siblani | G05B 19/042 700/119 |

FOREIGN PATENT DOCUMENTS

| | | |
|---|---|---|
| GB | 2378150 A | 2/2003 |
| JP | 07-100941 A | 4/1995 |
| JP | 2003-136604 A | 5/2003 |
| JP | 2006-334684 A | 12/2006 |

OTHER PUBLICATIONS

FR Search Report, dated Mar. 21, 2013, from corresponds to FR application.

* cited by examiner

METHOD AND APPARATUS FOR CONTROLLING A LASER BEAM FOR MANUFACTURING THREE-DIMENSIONAL OBJECTS BY MEANS OF STACKED LAYERS

BACKGROUND OF THE INVENTION

Field of the Invention

The present invention relates to a method for controlling a laser beam for manufacturing three-dimensional objects by means of stacked layers and an associated device for manufacturing three-dimensional objects by means of stacked layers.

The invention belongs to the technical field of manufacturing three-dimensional objects by laser processing, in particular laser sintering.

Description of the Related Art

It is known to manufacture three-dimensional objects without shape constraints using laser sintering layer-by-layer additive manufacturing. Such a manufacturing method includes depositing a layer of powdered or liquid product on a substrate, which can be a previously solidified layer of the object to be manufactured. The layer of powdered or liquid material is gradually solidified by applying a laser beam, also called lasing, in a zone defined by a two-dimensional section of the object to be manufactured. Thus, a three-dimensional object is manufactured by stacking layers, each layer corresponding to a two-dimensional section of the object to be manufactured.

In a known manner, the laser beam is set in motion, using mirrors actuated by galvanometric motors, called galvanometric mirrors, along rectilinear paths, spaced apart by a distance determined based on the physical constraints of the material used, so as to gradually solidify the zone corresponding to the two-dimensional section to be manufactured.

FIG. 1 diagrammatically illustrates rectilinear paths as illustrated in the state of the art, to solidify a layer of two-dimensional section 10. The rectilinear paths or vectors 12 are characterized by the ends 14, 16, which are defined relative to the geometric contour 18 of the two-dimensional section 10. According to a first known manufacturing method, the laser beam successively moves over all of the rectilinear paths 12 in a given direction, indicated by the direction of the arrows in FIG. 1, starting from a path starting point 14 toward a path ending point 16. To go from one path to the next, it is necessary to stop the laser source, reposition the galvanometric mirror(s) and then restart the laser source. The cumulative stop, repositioning and resumption times, or the transition times between two paths, are a source of considerable productivity losses.

To resolve this problem, it has been proposed in the state of the art to travel the rectilinear paths alternating the travel directions, so as to decrease the distance between the end point of one path and the start point of the following path, and therefore to decrease the transition time. For example, in reference to FIG. 1, after traveling a rectilinear path between the point 14 and the point 16, the following rectilinear path is traveled from the point 16' toward the point 14'. This improvement in productivity remains insufficient, inasmuch as there are a large number of rectilinear paths to be traveled in order to solidify the entire zone 10 by applying the laser beam.

Furthermore, the large number of paths causes a large number of path starting and ending points, therefore a large number of locations where the lased surface is marked, which produces a so-called "surface" effect and results in certain imperfections in the obtained lased surface. This phenomenon persists even if the contour 18 is retraced by applying the laser beam.

There is therefore a need to resolve the drawbacks of the methods known in the state of the art, allowing better productivity and an improved surface state of the parts obtained by laser sintering in layers.

SUMMARY OF THE INVENTION

To that end, the invention proposes a method for controlling a laser beam for manufacturing three-dimensional objects by means of stacked layers, comprising, for each layer, a step for using a laser beam to solidify a zone corresponding to a two-dimensional object to be manufactured, such a two-dimensional section having a geometric contour.

For at least one said two-dimensional section, the method comprises the following steps:

acquiring the geometric contour of said two-dimensional section, determining a reference path from said geometric contour of the section, said reference path having a shape correlated to the shape of said geometric contour, determining a set of paths based on said reference path, and controlling the laser beam to travel all of the determined paths using a travel strategy defining a travel order of the paths and a starting point for each path.

Advantageously, the definition of a reference path from the geometric contour of the two-dimensional section of the object to be manufactured, and the definition of the set of paths from a reference path, allows minute adaptation of the geometry of the object to be manufactured. Thus, the quality of the obtained surface is improved. Furthermore, the number of paths can be considerably decreased, which makes it possible to decrease the stop and repositioning times (transition times), and therefore to increase the manufacturing productivity.

The method for controlling a laser beam according to the invention can also comprise one or more of the features below:

said reference path corresponds to said geometric contour of the section;

the determination of a set of paths includes generating a plurality of interlocking paths, calculated by geometric transform from the reference path, based on a predetermined distance between two successive paths;

said reference path is a median path obtained from a set of points that are equidistant from points selected on said geometric contour;

the determination of a set of paths includes generating a plurality of paths parallel to the reference path, two successive paths being separated by a predetermined distance;

the determination of a set of paths includes, for a zone of said two-dimensional section having a corresponding segment of the reference path, choosing between paths parallel and orthogonal to said segment of the reference path based on a predetermined criterion;

it further includes a step for determining said travel strategy, making it possible to minimize the distance between an end-of-travel point of a path and a beginning-of-travel point of a next path in the travel order;

said travel strategy also includes defining a travel mode for each path from the set of paths, from among a path in one predetermined position and alternating between two predetermined travel directions.

According to a second aspect, the invention relates to a device for manufacturing three-dimensional objects by means of stacked layers, able to apply, for each layer to be manufactured, laser beam solidification of a zone corresponding to a two-dimensional section of a three-dimensional object to be manufactured, one said two-dimensional section having a geometric contour, comprising means for deflecting a laser beam.

The device according to the invention comprises:

means for acquiring the geometric contour of said two-dimensional section, means for determining a reference path from said geometric contour of the section, said reference path having a shape correlated to the shape of said geometric contour, means for determining a set of paths based on said reference path, and means for controlling said means for deflecting the laser beam, able to control said laser beam to move over all of the determined paths following a travel strategy defining a travel order and a travel starting point for each path.

According to one feature, the device comprises a computation unit able to implement the geometric contour acquisition means, the reference path determining means and the means for determining the set of paths.

BRIEF DESCRIPTION OF THE DRAWING FIGURES

Other features and advantages of the invention will emerge from the description thereof provided below, for information and non-limitingly, in reference to the appended figures, in which:

FIG. 1, already described, is a diagrammatic view of a two-dimensional section to be processed by a laser beam along rectilinear paths, according to the state of the art;

Figure 5:
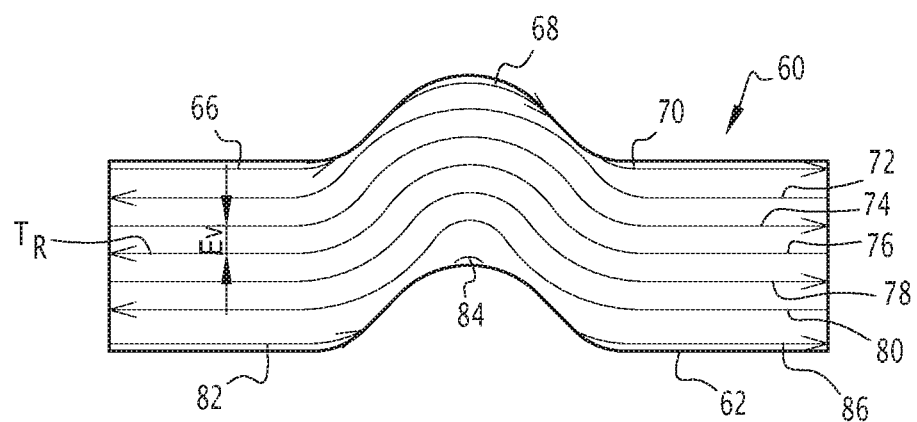
Figure 6:
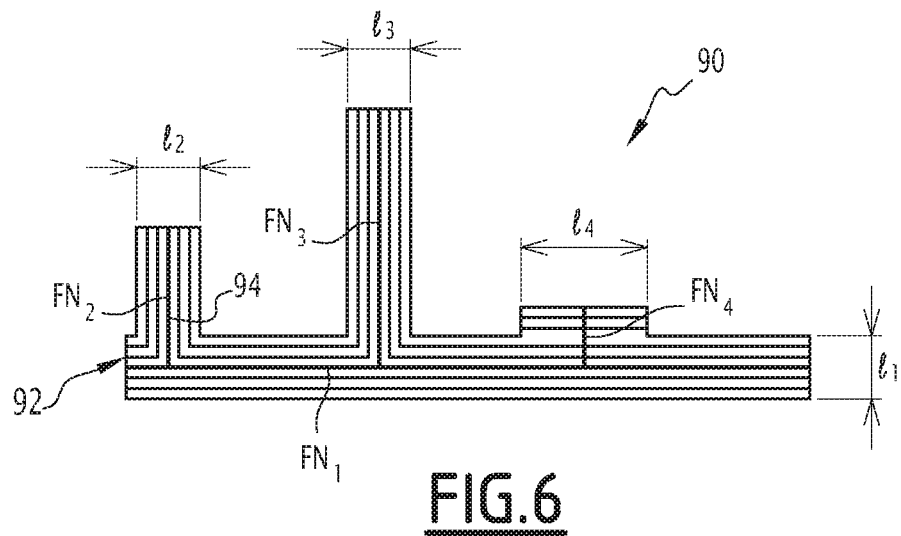
Figure 7:
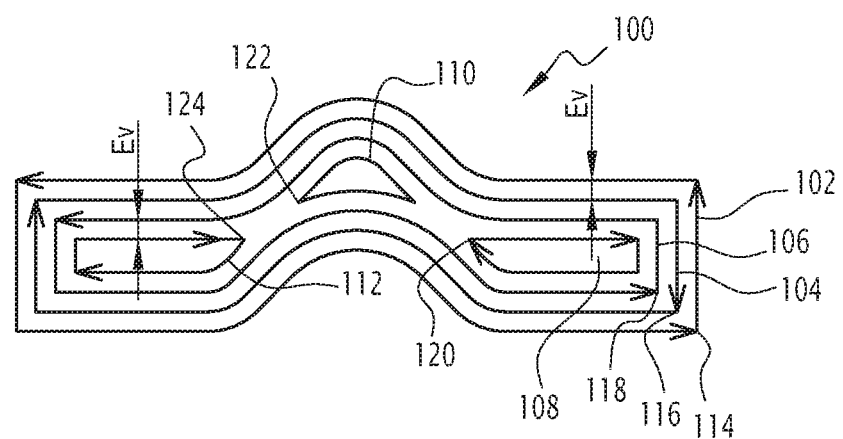

FIG. 5 diagrammatically shows all of the paths built from the reference path according to the first embodiment;

FIG. 6 is a top view of a two-dimensional section of an object to be manufactured and the set of paths according to one alternative of the first embodiment of the invention, and FIG. 7 diagrammatically shows all of the paths according to a second embodiment of the invention.

DETAILED DESCRIPTION OF THE INVENTION

The invention will be described in its application to the manufacture of three-dimensional objects without shape constraints, by manufacturing stacked layers, each layer corresponding to a two-dimensional section of the object to be manufactured. Each layer is formed by solidifying a liquid or powdered material by applying a laser beam, in order to obtain a solid zone defined based on the corresponding two-dimensional section of the layer.

Figure 1:
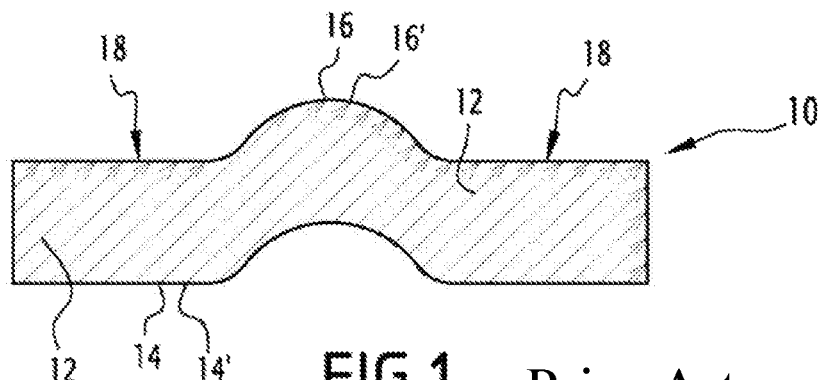
Figure 2:
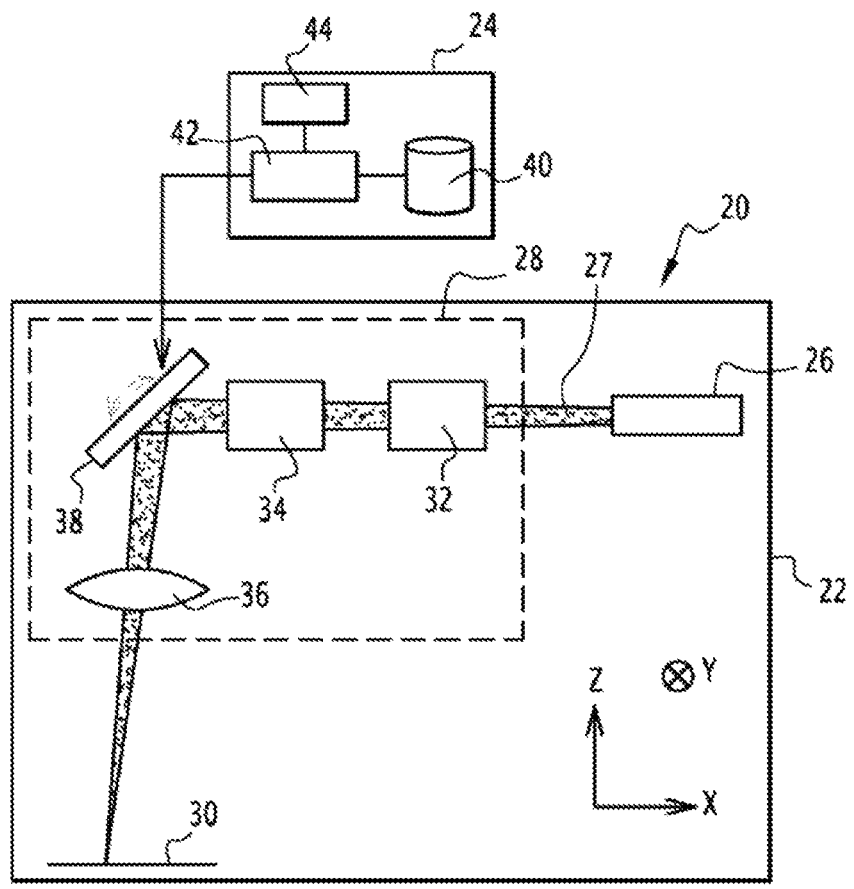
FIG. 2 is a schematic diagram of an installation for manufacturing objects by laser sintering in layers.

FIG. 2 illustrates schematically modules of a manufacturing device by means of stacked layers, implementing a laser beam; only the modules of interest for implementation of the invention are described.

The device 20 comprises a lasing unit 22 and a computation unit 24, for example a computer. The lasing unit 22 comprises an electromagnetic radiation source or laser source 26 able to provide a laser beam 27, a galvanometric head 28 and a sintering field 30, which is shown here in cross-section and on which each layer of the object to be manufactured is made.

The galvanometric head 28 comprises means 32 for shaping the laser beam 27, referred to as a "beam shaper" or "beam expander", means for changing the focal distance 34 and/or a flatfield objective lens 36. Furthermore, the galvanometric head comprises means 38 for deflecting the laser beam in a plane XY, for example formed by two mirrors mounted on two galvanometric motors whose axes are perpendicular to each other. For simplification reasons, only one mirror is shown.

The computation unit 24 can send control orders to the means 38 for deflecting the beam, so as to sweep the laser beam over a given path of the sintering field 30 that comprises a layer of liquid or powdered material making it possible to produce a layer of the object to be manufactured.

The computation unit 24, which is for example a computer, in particular comprises data storage means 40 and a processor 42, able to perform computations and execute instructions from computer program code, making it possible to implement a method for controlling a laser beam according to the invention. In particular, the storage means 40 can store data relative to the shape of each two-dimensional section of the three-dimensional object to be manufactured, for example provided by appropriate computer-assisted design and manufacturing (CADM) software (not shown in the figure). The computation unit 24 also comprises man-machine interfacing means 44, in particular allowing an operator to provide parameters useful for implementing a laser beam control method according to the invention.

Figure 3:
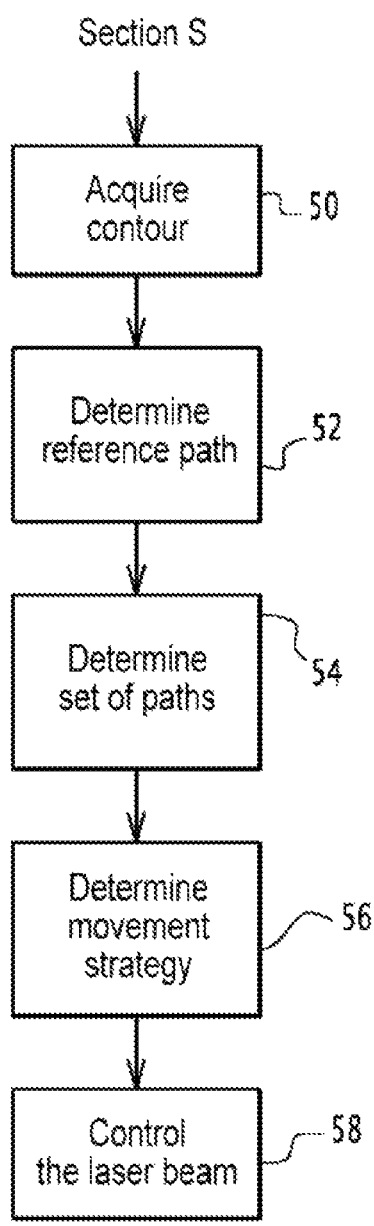
FIG. 3 is a block diagram showing the steps of a method for controlling a laser beam according to one embodiment of the invention.

According to a general principle illustrated in FIG. 3, a method for controlling a laser beam for manufacturing three-dimensional objects by means of stacked layers is applied, for each layer to be manufactured. A two-dimensional section corresponding to the layer to be manufactured is provided as input. As explained above, such a section, defining the contour(s) of the material to be solidified in the sintering field 30, is for example provided by CADM software for each successive layer.

In a first step 50, the geometric contour of the section is first obtained. When it involves manufacturing objects with any shape whatsoever, the geometric contour has any geometric shape, as illustrated later in FIGS. 4 to 7. Such a contour may or may not have linear portions, and may have a polygonal shape. In the event the layer to be manufactured is made up of several unconnected portions of material, each portion is processed individually, with its two-dimensional section and its associated geometric contour.

Step 50 is followed by a step 52 for determining a reference path of the two-dimensional section to be processed, the reference path being computed from the geometric contour of the section. Several embodiments of this step 52 are considered, these various embodiments being illustrated in more detail below in reference to FIGS. 4 to 7.

According to a first embodiment, a reference path is defined as a median path relative to the contours, comprising points equidistant from points of the geometric contour of the section, computed using a Voronoï or Delaunay algorithm. In particular, the Delaunay method comprises a triangulation, the apices of the triangles being on the geometric contour of the section, the apical points being selected, in a known manner, based on a piecewise linear representation of the contour. A reference path is defined by all of the points passing through the midpoints of the sides of the Delaunay triangles. Thus, the points of the traced path are equidistant from selected points of the contour. In this first embodiment, the reference path is a skeleton representative of the geometric contour of the section.

According to a second embodiment, the geometric contour of the two-dimensional section to be processed defines the reference path. In other words, the reference path is obtained directly from the geometric contour of the section. In this second embodiment, the reference path is a closed curve.

As can be seen, according to these two embodiments, the reference path is a path whose shape is correlated with the geometric contour of the section and which is therefore specifically adapted to the processed section, and it is a path with any geometric shape. In the first embodiment, the shape of the reference path is deduced from the geometric contour of the section by analytical computation, and it is correlated to the shape of the contour because it is a "skeleton" obtained from the contour. In the second embodiment, the shape of the reference path is identical to the geometric shape of the contour.

A set of paths to be traveled by the laser beam is determined from the reference path in step 54, which is carried out after step 52. This set includes paths separated by a predetermined distance Ev, the distance Ev being precalculated based on the structure of the object to be manufactured and the physical properties of the materials used. For example, the distance Ev is comprised in a range of 10 μm to 150 μm.

The set of paths includes the reference path. The number of paths therefore depends on the distance Ev between two successive paths and the geometric shape of the contour, as will be seen in the examples illustrated below.

Once all of the paths to be traveled have been determined, a travel strategy is determined in step 56. A travel strategy includes the travel order for the paths of the set of paths for lasing, as well as the travel starting point for each path, the ending point being implicitly known, knowing the path and the geometric contour of the section. Additionally, the travel strategy can also define a travel mode, for example either in a given travel direction, or alternating between two travel directions between two successive paths, or according to another alternating mode. The travel strategy can be defined automatically, for example according to a criterion for minimizing the distance between the end of a path and the starting point of the next path in the travel order, so as to further optimize productivity while reducing transition times. Alternatively, the travel strategy is defined by an operator.

After obtaining the set of paths and the associated travel strategy, the method comprises a step 58 of controlling the laser beam, for example by sending a control order to the galvanometric motors of the means 38 for deflecting the laser beam in the plane XY. A very low pitch scan of the obtained paths allows very precise guiding of the means 38 for deflecting the laser beam, making it possible to obtain very precise paths with any geometric shape.

Figure 4:
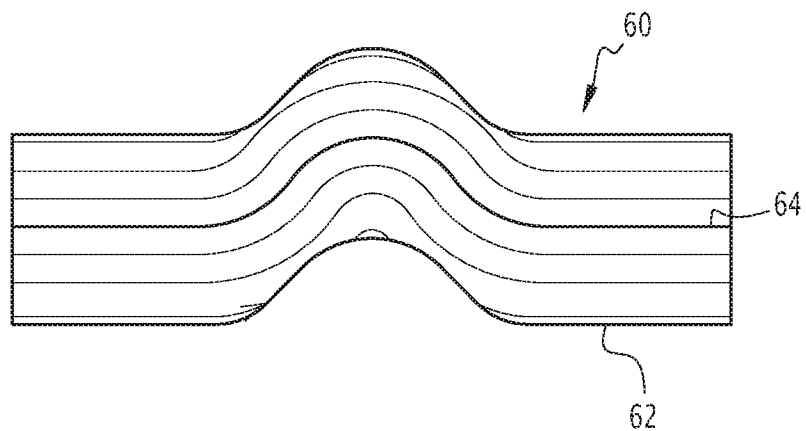
FIG. 4 is a top view of a two-dimensional section of an object to be manufactured and its reference path according to a first embodiment of the invention.

FIGS. 4 to 6 illustrate cross-sectional examples in top view according to the first embodiment of the invention, in which the reference path is a median path.

FIG. 4 illustrates a top view of a two-dimensional section 60 of an object to be manufactured, having a geometric contour 62. The reference path 64 is obtained by applying the Delaunay method described above to obtain skeletization by analytical computation. The points of the reference path 64 are situated at equal distances from the contour points in a given direction, as illustrated in the figure, where the reference path 64 is made up of points.

The same section 60 is shown in FIG. 5, with the reference path $T_R$ as illustrated in FIG. 4, as well as the set of paths determined from the reference path.

Each path is computed from the reference path $T_R$, and it is situated within geometric contour of the section 62 at a distance that is a multiple of Ev from the reference path $T_R$. As explained above, Ev is a given parameter, and the distance Ev between two successive paths is constant for a given two-dimensional section. Given two successive paths denoted $T_i$ and $T_{i+1}$, each point of the path $T_{i+1}$ is at a distance Ev (or offset) on the normal to that point from a point of the path $T_i$ in general. In the case of a discontinuous path $T_i$, i.e., if there are two separate tangents for a same point (inflection point), that point constitutes the center of rotation of the normals with length Ev, making it possible to create continuity on the path $T_{i+1}$.

According to an alternative embodiment, two successive paths of a two-dimensional section are at a constant distance Evi, but the distance Evi can vary within a given two-dimensional section, for example the distance separating the reference path and first following path is Ev1, then the distance between the first following path and the second is Ev2, and so forth.

All of the constraints cause some of the paths to be broken up, so as to be contained within the contour. Thus, the paths 66, 68 and 70 are at equal distances from the reference path $T_R$.

FIG. 5 illustrates a preferred travel order of the paths, which is indicated by the increasing order of the reference numbers. Thus, the travel order will be 66, 68, 70, etc. up to 86, with an alternating travel direction: having reached a point of the geometric contour 62, the travel direction is reversed, so as to decrease the distance between an end-of-travel point of a path and the beginning point of the following path.

Alternatively, other alternatives for the travel order of the paths and the travel mode (single direction or alternating directions) are considered.

For example, the travel order by decreasing reference numbers associated with the paths is equivalent to the travel in the increasing order of the reference numbers.

Travel in a single direction of the paths is slightly sub-optimal in terms of minimizing the stop and repositioning times.

According to another alternative, the following travel order is considered: 76, 74, 72, 70, 68, 66, then 78, 80, 86, 84, 82.

Nevertheless, it should be noted that a low number of closing paths is sufficient to move over the entire considered section, which represents increased productivity relative to the known glazing technique by means of rectilinear paths.

FIG. 6 illustrates an alternative according to the first embodiment of the invention, in this particular case a two-dimensional section with several zones or portions. In the particular case illustrated in FIG. 6, the section 90 to be processed is formed by several rectangular zones defined by the geometric contour 92, and by their respective width denoted $I_i$. Four zones can be seen, which will be called zone 1 to zone 4. In this example, the median reference path 94 is formed by a plurality of linear portions. More generally, the reference path is made up of several segments, each segment corresponding to one of the zones. Each segment of the reference path has an associated length, denoted $L_i$. In this example, there are four segments with respective lengths $L_1$, $L_2$, $L_3$ and $L_4$.

Of course, the number of segments is given for the example, the described method being applicable irrespective of the number of linear portions determined based on contours.

According to one alternative, the paths are computed, in each zone of the two-dimensional section, based on the reference, according to the following method.

Reference FNi denotes the segment, which is a linear portion in this example, of the median path in zone number i, with width $I_i$. The segment FNi has a length $L_i$.

Reference $Xti_P$ designates the number of paths parallel to the segment FNi, and $Xti_O$ designates the number of paths orthogonal to the segment FNi. The distance between two consecutive paths is predetermined and equal to Ev.

The respective numbers $Xti_P$ and $Xti_O$ are computed using the following formulas:

$$Xti_P = \frac{l_i}{Ev} \text{ and } Xti_O = \frac{L_i}{Ev}$$

For zone number i, paths are selected parallel to the segment FNi if $Xti_P$ is less than $Xti_O$ (therefore if the length of the segment $L_i$ is greater than the width $I_i$ of the zone) and vice versa, paths are selected that are orthogonal to FNi if $Xti_O$ is less than $Xti_P$, in order to minimize the overall number of paths.

An application of this method for determining paths from the reference path is illustrated in FIG. 6. FIG. 6 shows that in the zones 2 and 3, paths parallel to the segment of the reference path have been selected, whereas in zone 4, paths orthogonal to the segment FN4 have been selected.

Owing to this method for selecting paths based on the reference path, the total number of paths is minimized, which makes it possible to optimize productivity.

FIG. 7 illustrates a second method for obtaining a reference path according to the invention, and the set of associated paths.

Similarly to FIG. 4, FIG. 7 shows a top view of a two-dimensional section 100 of an object to be manufactured, having a geometric contour 102.

In this embodiment, the geometric contour 102 is a reference path. The other paths of the set of paths, denoted 104 to 112, are determined by a geometric transform from the reference path 102, according to the distance Ev between two successive paths. In fact, as in the first embodiment, an offset of Ev is applied between two successive paths denoted $T_i$ and $T_{i+1}$: each point of the path $T_{i+1}$ is at a distance Ev (or offset) on the normal to that point from a point of the path $T_i$.

As in the first embodiment, some paths are broken down into several sub-paths that all have a same distance that is a multiple of Ev from the reference path, for example such as the paths 108, 110 and 112. The paths traced from the reference path are interlocked.

A travel order from the outside toward the inside, in increasing order of the reference numbers associated with the paths, is considered.

Alternatively, the paths are traveled from the inside toward the outside, in decreasing order of the reference numbers in this example.

The paths being closed curves, for each path, the ending point of the path is the same as the starting point of the path.

Thus, any point of a path can be chosen as beginning-of-travel point.

For example, a set of beginning-of-travel points is indicated in FIG. 7, numbered from 114 to 124 for all of the provided paths. As in the first embodiment, it may be considered either to move over all of the paths in the same direction (for example, clockwise), or to alternate the travel direction using a given alternating rule.

However, alternating the travel directions is less relevant than in the first embodiment to decrease the transition times. Nevertheless, depending on the applications, the travel direction may be alternated, in particular to improve the homogeneity of the temperature during processing of the section.

Advantageously, in this second embodiment, the number of paths necessary to process the section, by applying the predetermined distance Ev between two paths, is further decreased, which makes it possible to further decrease the transition times and increase productivity.

Two embodiments for determining the reference path have been explained. It should be noted that the choice between these modes can be made based on the shape of the geometric contour of the two-dimensional section to be processed, so as to favor productivity and the obtained surface quality. Advantageously, owing to this embodiment, any type of geometric contour shape can be processed to control the laser beam according to the invention.

The invention is not limited to the examples described and shown.

Thus, it is for example possible to consider associating a number with each processed two-dimensional section and alternating between the two embodiments described above, with various associated travel strategies, based on the number of the two-dimensional section, or any other parameter.

The invention claimed is:

1. A method for controlling a laser beam for manufacturing three-dimensional objects by means of stacked layers, comprising, for each layer, a step for using a laser beam to solidify a zone corresponding to a two-dimensional section of a three-dimensional object to be manufactured, such a two-dimensional section having a geometric contour, comprising, for at least one said two-dimensional section, the following steps:

acquiring the geometric contour of said two-dimensional section, determining by calculation a reference path from said geometric contour of the section, said reference path having a shape correlated to the shape of said geometric contour, determining a set of paths based on said reference path, and controlling the laser beam to travel all of the determined paths using a travel strategy defining a travel order of the paths and a starting point for each path, wherein the determination of a set of paths includes, for a zone of said two-dimensional section having a corresponding segment of the reference path, choosing between paths parallel and orthogonal to said segment of the reference path based on a predetermined criterion.

2. The method according to claim 1, wherein the reference path corresponds to said geometric contour of the section.

3. The method according to claim 2, wherein the determination of a set of paths includes generating a plurality of interlocking paths, calculated by geometric transform from the reference path, based on a predetermined distance between two successive paths.

4. The method according to claim 1, wherein said reference path is a median path obtained from a set of points that are equidistant from points selected on said geometric contour.

5. The method according to claim 4, wherein the determination of a set of paths includes generating a plurality of paths parallel to the reference path, two successive paths being separated by a predetermined distance.

6. The method according to claim 1, further comprising a step for determining said travel strategy, making it possible to minimize the distance between an end-of-travel point of a path and a beginning-of-travel point of a next path in the travel order.

7. The method according to claim 1, wherein said travel strategy also includes defining a travel mode for each path from the set of paths, from among travelling a path in one predetermined direction and alternating between two predetermined travel directions.

8. A device for manufacturing three-dimensional objects by means of stacked layers, able to apply, for each layer to be manufactured, laser beam solidification of a zone corresponding to a two-dimensional section of a three-dimensional object to be manufactured, one said two-dimensional section having a geometric contour, comprising means for deflecting a laser beam, comprising:
    means for acquiring the geometric contour of said two-dimensional section,
    means for determining a reference path by calculation from said geometric contour of the section, said reference path having a shape correlated to the shape of said geometric contour,
    means for determining a set of paths based on said reference path, and
    means for controlling said means for deflecting the laser beam, able to control said laser beam to move over all of the determined paths following a travel strategy defining a travel order and a travel starting point for each path,
    wherein the determination of a set of paths includes, for a zone of said two-dimensional section having a corresponding segment of the reference path, choosing between paths parallel and orthogonal to said segment of the reference path based on a predetermined criterion.

9. The device according to claim 8, further comprising a computation unit able to implement said geometric contour acquisition means, said reference path determining means and said means for determining the set of paths.

10. The device according to claim 8, further comprising:
    a laser unit including a laser source, a galvanometric head and a sintering field.

11. The device according to claim 10, wherein the galvanometric head comprises a beam shaper, at least one of a device that changes focal distance or a flat field objective lens, and at least one mirror configured to deflect the laser beam.

* * * * *